US009207938B2

(12) United States Patent
Warren et al.

(10) Patent No.: US 9,207,938 B2
(45) Date of Patent: Dec. 8, 2015

(54) INSTRUCTION FORWARDING BASED ON PREDICATION CRITERIA

(75) Inventors: David A Warren, El Dorado Hills, CA (US); Thomas A Keaveny, Auburn, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 669 days.

(21) Appl. No.: 13/598,267

(22) Filed: Aug. 29, 2012

(65) Prior Publication Data

US 2014/0068228 A1    Mar. 6, 2014

(51) Int. Cl.
*G06F 9/30* (2006.01)
*G06F 9/38* (2006.01)

(52) U.S. Cl.
CPC .......... *G06F 9/30043* (2013.01); *G06F 9/3802* (2013.01); *G06F 9/3836* (2013.01)

(58) Field of Classification Search
CPC ... G06F 9/3802; G06F 9/3851; G06F 9/3814; G06F 9/3017; G06F 9/30149; G06F 9/3836; G06F 9/3885; G06F 9/3838; G06F 9/3824
See application file for complete search history.

(56) References Cited

U.S. PATENT DOCUMENTS 4,710,866 A * 12/1987 Zolnowsky et al. .......... 712/207
5,321,606 A    6/1994 Kuruma et al.
5,353,421 A * 10/1994 Emma et al. ................. 712/240
6,662,294 B1 * 12/2003 Kahle et al. .................. 712/226
9,001,701 B1 *  4/2015 Zhang et al. ................. 370/260
2012/0084539 A1 *  4/2012 Nyland et al. ................ 712/229
2013/0067205 A1 *  3/2013 Plondke et al. .............. 712/223

FOREIGN PATENT DOCUMENTS

WO    2011056087    5/2011

OTHER PUBLICATIONS

Bratt, I.R. et al., Predicate-based Transformations to Eliminate Control and Data-irrelevant Cache Misses, (Research Paper), In Proceedings of the First Workshop on Explicitly Parallel Instruction Computing Architectures and Compiler Techniques, Dec. 2001, pp. 11-22.

Lucena, C.J. et al., The Data Transform Programming Method: an Example for File Processing Problems, (Research Paper), In Proceedings of the 7th international conference on Software engineering, 1984, pp. 388-397.

* cited by examiner

*Primary Examiner* — Farley Abad
(74) *Attorney, Agent, or Firm* — Hewlett-Packard Patent Department

(57)    ABSTRACT

Embodiments herein relate to forwarding an instruction based on predication criteria. A predicate state associated with a packet of data is to be compared to an instruction associated with the predication criteria. The instruction is to be forwarded to an execution unit if the predication criteria includes or matches the predicate state of the packet.

12 Claims, 6 Drawing Sheets

| Program # | Instruction # | Operation |
|---|---|---|
| 1 | 1 | Modify MAC Addresses |
|   | 2 | Modify TTL |
|   | 3 | Modify TOS |
|   | 4 | Copy to end of pkt |
| 2 | 1 | Modify MAC Addresses |
|   | 2 | Delete TAG1 |
|   | 3 | Modify TTL |
|   | 4 | Modify TOS |
|   | 5 | Copy to end of pkt |
| 3 | 1 | Modify MAC Addresses |
|   | 2 | Delete TAG1 |
|   | 3 | Delete TAG2 |
|   | 4 | Modify TTL |
|   | 5 | Modify TOS |
|   | 6 | Copy to end of pkt |

FIG. 3B

| Predication Criteria | | Program # | Instruction # | Operation |
|---|---|---|---|---|
| Predicate[1] | Predicate[0] | | | |
| X | X | 1 | 1 | Modify MAC Addresses |
| 1 | X |   | 2 | Delete TAG1 |
| 1 | 1 |   | 3 | Delete TAG2 |
| X | X |   | 4 | Modify TTL |
| X | X |   | 5 | Modify TOS |
| X | X |   | 6 | Copy to end of pkt |

INSTRUCTION FORWARDING BASED ON PREDICATION CRITERIA

BACKGROUND

Processors may carry out various type of operations, such as data transforms. Such processors may be included in network switch and process network data passing through the switch at high throughput rates. Manufacturers are challenged to find ways to improve throughput rates and reduce costs and size of the switch.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Processors, such as data transform processors included in network switches, may be able to modify individual packets at very high rates. The term data transform may refer to any type of operation performed on a packet of data that changes one or more properties of the packet. For example, encapsulation, decapsulation, adding or removing a tag or field, modifying a payload or header of the packet, and the like may constitute different types of data transforms.

Moving data or a packet of data in every clock cycle may yield a greater throughput. Thus, modification programs that run on a processor, such as the data transform processor, are usually optimized for execution in the least number of clock cycles possible. In order to do so, such modification programs may prohibit traditional branching instructions during execution of the programs because branching instructions usually require additional clock cycles to move to and load the next instruction.

Branching is primarily a software function. In many situations, the extra clock cycle or two needed to perform a branch may be insignificant to performance. However, in data transform processing, the extra clock cycles can have a negative effect on the overall performance. Data transform processors may often have throughput requirements, which may be measured, for example, in giga-bits per second (Gbps). To meet these requirements, data is moved as fast as possible through the processor by optimizing the use of each clock cycle. This aspect of the data transform processor makes it undesirable to support branching type instructions, which generally use at least one additional clock cycle to move to the next branched instruction.

In order to avoid branching instructions, a large number of modification programs are created for the many types of different possible data transforms. The modification programs are generally stored in a memory of the processor. While creating different modification programs for the different types of possible data transforms reduces or eliminates branch instructions and maximizes throughput performance, a storage capacity of the processor's memory may become excessively larger.

This larger memory requirement can add unwanted additional costs, especially when faster and more expensive types of memory are used for the processor. Yet reducing memory requirement needs by creating smaller or fewer programs that are capable of handling multiple variants of data transforms, e.g. multi-purpose programs, generally requires branching instructions to skip to specific lines of code not needed for a specific type of data transform. As explained above, such branching operations may reduce the maximum throughput. Hence, a designer or manufacturer is posed with a dilemma of choosing between improved performance with a larger or more expensive memory or decreased performance with a smaller and cheaper memory.

Embodiments may provide predicate based instruction loading to implement branch-type instructions of a program without affecting the data throughput or drastically increasing memory requirements. For example, an embodiment may include an instruction unit and a fetch unit. The instruction unit is to store a program including an instruction associated with the predication criteria. The fetch unit is to compare a predicate state associated with a current packet of data to the predication criteria and is to forward the instruction to an execution unit if the predication criteria includes the predicate state of the current packet.

Using predication criteria and a predicate state, such as through control bits, may provide a relatively large amount of flexibility, thus allowing a single program in memory to be used on a multitude of possible transforms, thereby reducing the memory size while avoiding the processing of branch instructions at the execution unit. Thus, embodiments may allow for improved throughput performance with reduced memory requirements and lower costs, when compared to non-predicate based techniques.

Figure 1:
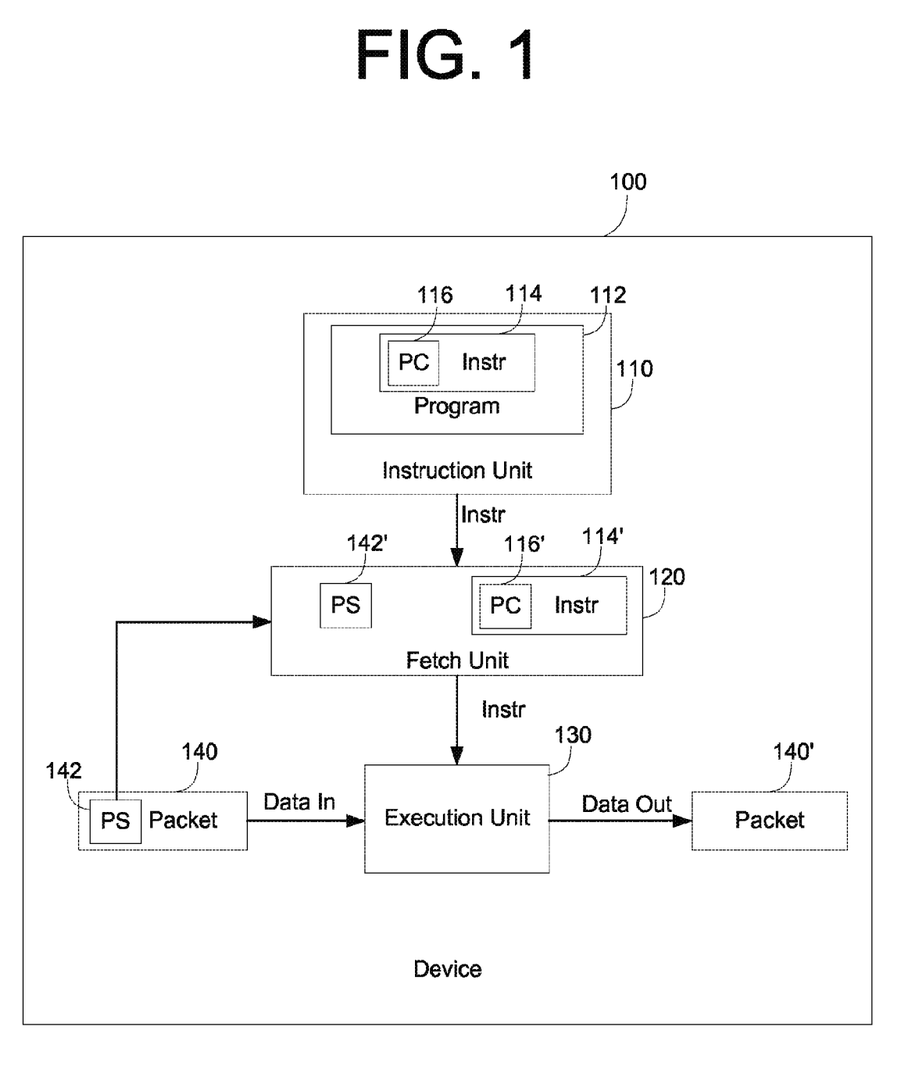
FIG. 1 is an example block diagram of a device to forward an instruction based on predication criteria.

Referring now to the drawings, FIG. 1 is an example block diagram of a device 100 to forward an instruction based on predication criteria. The device 100 may be any type of device that processes packets of data, such as a switch, hub, router, bridge, gateway, server and the like. For example, the device 100 may apply to devices with program storage limits and performance requirements that limit their ability to use execution cycles for branching or jumping, such as in the areas of high performance analytics or real-time image processing. In these instances, the device 100 may have a minimum instructions/cycle throughput threshold to satisfy and branch or jump instructions may reduce throughput.

In FIG. 1, the device 100 includes an instruction unit 110, a fetch unit 120 and an execution unit 130. The instruction unit 110 includes a program 112 having an instruction 114 and the instruction 114 is associated with predication criteria 116 (PC), as described in further detail below. The instruction and fetch units 110 and 120 may include, for example, a hardware device including electronic circuitry for implementing the functionality described below, such as control logic and/or memory. In addition or as an alternative, the instruction and fetch units 110 may be implemented as a series of instructions encoded on a machine-readable storage medium and executable by a processor. The execution unit 130 may include a processor, such as a central processing unit (CPU), a semiconductor-based microprocessor, a graphics processing unit (GPU), and other hardware devices suitable for retrieval and execution of instructions stored in fetch unit 120 and/or instruction unit 110.

The instruction unit 110 is shown to store the program 112 including the instruction 114 associated with the predication criteria 116. However, embodiments may include a plurality of programs, where each program may include more than one instruction, and/or a single program including a plurality of instructions. The predication criteria 116 may indicate one or more predicates states for which the associated instruction 114 is to be executed. The predicate state 142 (PS) may refer to a value included in a current packet of data 140 while the predication criteria 116 may refer to a value or a set of values stored in the instruction unit 110 and associated with an instruction, such as the instruction 114. In one embodiment, a packet of data may include a predicate state field that stores the predicate state 142. FIG. 1 shows the current packet 140 that was received by the device 100 to include the predicate state 142. The predicate state 142 may indicate one or more operations to be performed on the associated current packet of data For example, the predicate state 142 may have a binary, two-bit value of "10" while the predication criteria 116 may have a binary, two-bit value of "1X." Thus, the instruction 114 associated with the predication criteria of "1X" may be executed on packets 140 having the predicate state 142 of "11" and/or "10". Conversely, the instruction 114 associated with the predication criteria of "1X" should not be executed on packets 140 having the predicate state 142 of "00" and/or "01." Different types of packets may have different types of predicate states. Similarly, different type of instructions and/or different types of programs may have different predication criteria values, and thus be executed for different types of packets.

The fetch unit 120 is to compare the predicate state 142 associated with the current packet of data 140 to the predication criteria 116. For example, the fetch unit 120 may inspect the current packet 140 for its predicate state 142 and store a value of the predicate state 142' of the current packet 140 at the fetch unit 120. Then, the fetch unit 120 may inspect the predication criteria 116 of the instruction 114 or a plurality of instructions at the instruction unit 110 and fetch only the instructions that have predication criteria 116 including the predicate sate 142.

Alternatively, the fetch unit 120 may load a plurality of instructions from the instruction unit 110 without checking the predication criteria 116. Instead, the fetch unit 110 may check the predication criteria 116 after loading the instructions, and then discard the instructions which have predication criteria that do not include the predicate state 142 of the current packet 140. In one embodiment, a memory of the fetch unit 120 may have a smaller capacity but higher operating speed than that of the instruction unit 110.

After the fetch unit 120 determines the at least one instruction 114 that is associated with the predication criteria 116 matching the predicate state 142, the fetch unit 120 may forward the at least one instruction 114 to the execution unit 130. Conversely, the fetch unit 120 is to not forward the instruction 114 to the execution unit 116 if the associated predication criteria 116 does not include the predicate state 142. As noted above, the execution unit 130 may be a processor that is to execute the at least one instruction 114 on the current packet 140. Further, the predicate state 142 may be removed from the executed packet 140' by the execution unit 130.

Figure 2:
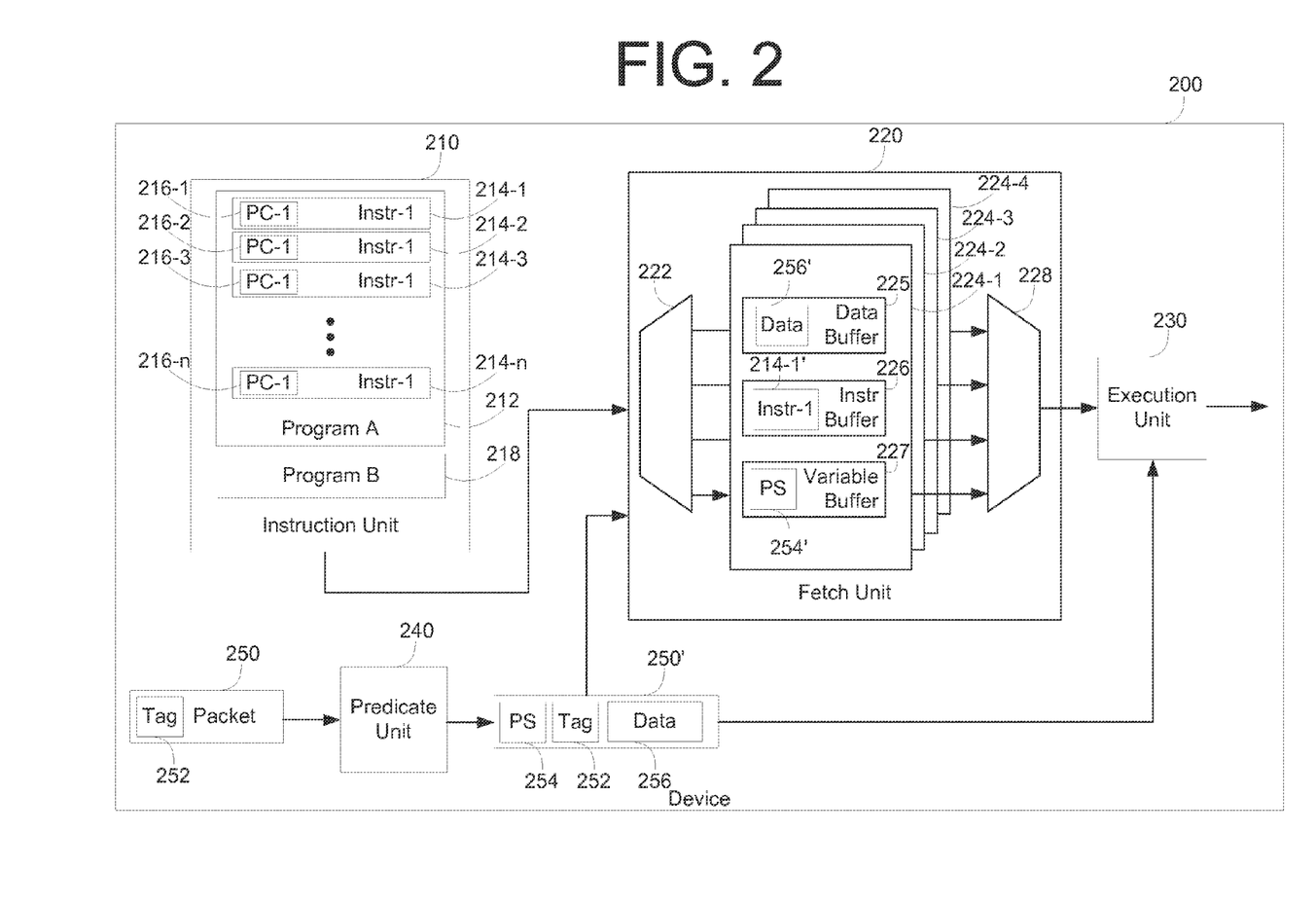
FIG. 2 is another example block diagram of a device to forward an instruction based on predication criteria.

FIG. 2 is another example block diagram of a device 200 to forward an instruction based on predication criteria. The device 200 may be any type of device that processes data, such as a switch, hub, router, bridge, gateway, server and the like. For example, the device 200 may apply to devices with program storage limits and performance requirements that limit their ability to use execution cycles for branching or jumping, such as in the areas of high performance analytics or real-time image processing. In these instances, the device 200 may have a minimum instructions/cycle throughput threshold to satisfy and branch or jump instructions may reduce throughput.

In FIG. 2, the device 200 includes an instruction unit 210, a fetch unit 220, an execution unit 230, and a predicate unit 240. The instruction unit 210, fetch unit 220 and execution unit 230 of FIG. 2 may at least respectively include the functionality and/or hardware of the instruction unit 110, fetch unit 120 and execution unit 130 of FIG. 1. The predicate unit 240 may include, for example, a hardware device including electronic circuitry for implementing the functionality described below, such as control logic and/or memory. In addition or as an alternative, the predicate unit 240 may be implemented as a series of instructions encoded on a machine-readable storage medium and executable by a processor.

The predicate unit 240 is to analyze the current packet of data 250 and to add a predicate field to the current packet of data 250'. The predicate field is to include the predicate state 254 and a value of the predicate state is to be based on the analysis of the current packet 250. For example, the predicate unit 240 may analyze at least one of one or more packet headers, a payload, one or more tags 252, and a packet size of the current packet of data 250 to determine the predicate state 254 of the current packet 250. After the predicate unit 240 analyzes the current packet 250 and adds the predicate state 254 thereto, the packet 250' is forwarded to the fetch unit 220. Thus, the predicate state 254 associated with the current packet 250' is determined before the current packet 250' is received by the execution unit 230 or fetch unit 220.

The instruction unit 210 is shown to include a plurality of programs, such as program A 212 and program B 218. Further program A 212 is shown to include a plurality of instructions 214-1 to 214-n associated with a plurality of predication criteria 216-1 to 216-n, where n is a natural number. The instruction unit 210 may include more or less than two programs. Further, the programs stored in the instruction unit 210, such as programs A and B, may be any type of program including at least instruction to modify a packet of data.

For the sake of simplicity of description, only some of the instructions 214-1 to 214-n of program A 212 have been illustrated. As shown in FIG. 2, the instructions 214-1 to 214-n include separate predication criteria 216-1 to 216-n. As explained above with respect to FIG. 1, the predication criteria 216-1 to 216-n may be one or more bits that specify for which types of packets of data the associated instruction 214 is to be executed upon. The instructions 214-1 to 214-n may copy without changes, insert information into, replace and/or delete at least part of the packet 250'. Example parts of the packet 250' may include a MAC address, a time to live (TTL) field, a type of service (TOS) field, a tag, a header, a payload and the like. An example of the instructions 214-1 to 214-n will be explained in greater detail with respect to FIG. 3B.

The fetch unit 220 is shown to include a multiplexer (mux) 222, a plurality of buffers 224-1 to 224-4 and demultiplexer (demux) 228. While FIG. 2, shows four buffers 224-1 to 224-4, embodiments may include more or less than four buffers. At least one of the buffers 224-1 to 224-4, such as the first buffer 224-1, may include a data buffer unit 225, an instruction buffer unit 226 and a variable buffer unit 227. The data buffer unit 225 is to store one or more of the incoming packets of data 250 or at least a payload or data portion 256 thereof. The instruction buffer unit 226 is to store the instructions 214 fetched from the instruction unit 210. For example, the instruction buffer 226 may store one or more instructions, such as the first instruction 214-1', associated with each of the packets 250 or data portions 256' thereof in the data buffer unit 225 for which the predication criteria 216 includes the predicate state 254 of the packet 250. The variable buffer unit 227 is to store information specific to the one or more packets 250 stored in the data buffer unit 210. For example, the specific information may including the predicate states 254' of the one or more packets 250', a new address, and the like.

While the mux 222 is only shown as a single mux and the demux 228 is only shown as a single demux, which select between the plurality of buffers 224-1 to 224-4, the mux 222 may consist of a plurality of multiplexers and the demux 228 may consist of a plurality of demultiplexers. For example, the fetch unit 220 may include separate multiplexers and demultiplexers operating in parallel and interfacing with each of the data buffer unit 225, instruction buffer unit 226 and the variable buffer unit 227 of each of the plurality of buffers 224-1 to 224-4.

As noted above, the fetch unit 220 may fetch the plurality of instructions 214-1 to 214-n and discard any of the fetched instructions for which the predication criteria 216-1 to 216-n does not include the predicate state 254' of the current packet of data 250'. The predicate state 254 may be compared to the predication criteria 216-1 to 215-n to determine which of the instructions 214-1 to 214-n are be forwarded to the execution unit 230 along with contents of the current packet 250'. However, when the instruction unit 210 stores more than one program the predicate state 254 may also be used to select the one of the programs. As noted above, the predicate state 254 may be a value and the predication criteria 216 may be a set of one or more values. Thus, for example, by including additional information and/or bits in the predicate state 254 and/or predication criteria 216-1 to 216-n about program selection, the fetch unit 220 may be able to determine from which program to fetch one or more instructions.

For instance, the predicate unit 240 may analyze Layer 2 (Ethernet) and/or Layer (IP) protocol headers and the size of an IP datagram of the packet 250 to set the predicate state 254 and the fetch unit 220 may select a general transform program based thereon. In another instance, the predicate state 254 may determine how the Layer 2 header is modified or Layer 3 header is refined, based on its original state. Further, the predicate state 254 may alter the effective length of the packet 250 based on its size, such as by truncating or appending pad bytes to the packet 250.

The fetch unit 220 may forward the one or more instructions 214 to the instruction buffer 226 for which the predication criteria 216 includes the predicate state 254' of the current packet 250'. The execution unit 230 may retrieve instructions to execute from the instruction buffer 226. As noted above, the execution unit 230, such as a processor, is to execute the one or more instructions 214 on the current packet of data 250' and to output the executed packet. The one or more instructions executed by the execution unit 230 are not a branch or jump instruction. Further, the execution unit 230 is to not inspect the predicate state 254 of the current packet of data 250' and may even remove the predicate state 254 from the packet 250' before outputting it. The fetch unit 220 may fetch a next packet of data while the current packet of data 250' is being executed.

Figure 3A:
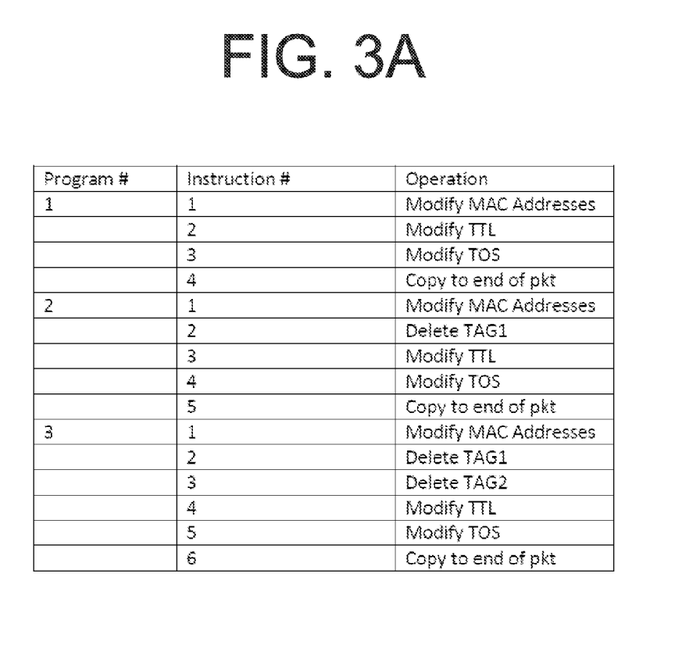
FIG. 3A is an example of instructions without predication criteria and FIG. 3B is an example of instructions with predication criteria.
Figure 3B:
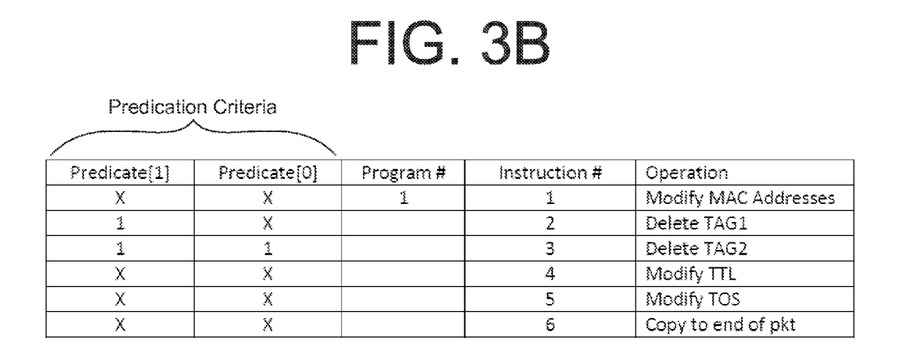

FIG. 3A is an example of instructions without predication criteria and FIG. 3B is an example of instructions with predication criteria. Three programs 1-3 are shown in FIG. 3A with a varying number of instructions. For example, the first program 1 is shown to include four instructions, the second program 2 is shown to include five instructions, and the third program 3 is shown to include six instructions. Each of these programs 1-3 are to be executed on a different type of packet. However, as shown in FIG. 3A, all three programs include common instructions. For example, all three programs include a "modify MAC addresses," "modify TTL," "modify TOS" and "copy to end of pkt" instruction. The "modify MAC addresses" instruction may relate to modifying at least one of a destination and source MAC addresses of the packet 250. The "modify TTL" instruction may relate to modifying the TTL field of the packet 250. The "modify TOS" instruction may relate to modifying the TOS field of the packet and the "copy to end of pkt" instruction may relate to modifying a payload or data portion of the packet 250.

Further, the second and third programs 2 and 3 both include the "delete TAG1" instruction, which may relate to deleting a tag of a packet 250. Thus, while the three programs 1-3 together require storage capacity for fifteen instructions, there are only six unique instructions between all of the three programs 1-3. FIG. 3B shows an example of instructions with predication criteria, such as in the instruction unit 210 of FIG. 2. By adding predication criteria, storage capacity for only six instructions may now be needed, along with an additional two bits of capacity for the predicate bits of the predication criteria of each of the six instructions.

For example, the predication bits "XX" may indicate that the associated instruction is always executed, regardless of a predicate state of the packet. In this instance, the instructions "modify MAC addresses," "modify TTL," "modify TOS" and "copy to end of pkt" are shown to have the predication criteria bits "XX" because all the programs execute these instructions. The predication criteria bits "1X" may indicate that the associated instruction is only executed for packets having the predicate state "11" or "10". In this instance, the instruction "delete TAG1" is associated with the predication criteria bits "1X" and was included in the second and third programs 2 and 3 of FIG. 3A. The predication criteria bits "11" may indicate that the associated instruction is only executed for packets having the predicate state "11". In this instance, the instruction "delete TAG2" is associated with the predication criteria bits "11" and was included in only the third program 3 of FIG. 3A.

Thus, storage requirements may be greatly reduced by using predication criteria to reduce a plurality of unique programs to a single multi-purpose program, without the introduction of jump or branch instructions. While FIG. 3B only shows the predication criteria for a single program, embodiments may include a plurality of programs. For example, the predication criteria may include additional bits to distinguish between different types of programs and/or the instructions thereof.

Figure 4:
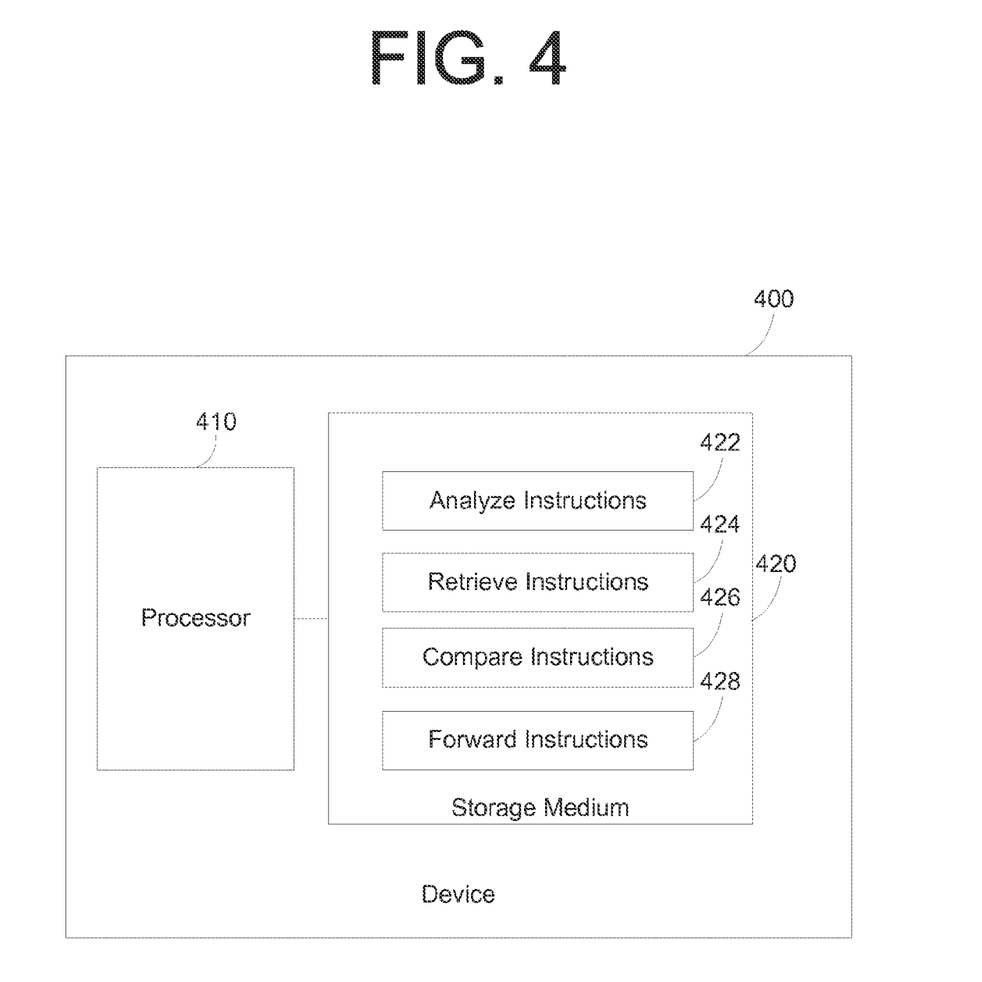
FIG. 4 is an example block diagram of a computing device including instructions for forwarding an instruction based on predication criteria.

FIG. 4 is an example block diagram of a computing device 400 including instructions for forwarding an instruction based on predication criteria. In the embodiment of FIG. 4, the computing device 400 includes a processor 410 and a machine-readable storage medium 420. The machine-readable storage medium 420 further includes instructions 422, 424, 426 and 428 for forwarding an instruction based on predication criteria. The computing device 400 may be, for example, a router, a switch, a gateway, a bridge, a server or any other type of device capable of executing the instructions 422, 424, 426 and 428. In certain examples, the computing device 400 may be included or be connected to additional components such as a storage drive, a processor, a network appliance, etc.

The processor 410 may be, at least one central processing unit (CPU), at least one semiconductor-based microprocessor, at least one graphics processing unit (GPU), other hardware devices suitable for retrieval and execution of instructions stored in the machine-readable storage medium 420, or combinations thereof. The processor 410 may fetch, decode, and execute instructions 422, 424, 426 and 428 to implement forwarding an instruction based on predication criteria. As an alternative or in addition to retrieving and executing instructions, the processor 410 may include at least one integrated circuit (IC), other control logic, other electronic circuits, or combinations thereof that include a number of electronic components for performing the functionality of instructions 422, 424, 426 and 428.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 420 can be non-transitory. As described in detail below, machine-readable storage medium 420 may be encoded with a series of executable instructions for forwarding an instruction based on the predication criteria.

Moreover, the instructions 422, 424, 426 and 428 when executed by a processor (e.g., via one processing element or multiple processing elements of the processor) can cause the processor to perform processes, such as, the process of FIG. 4. For example, the analyze instructions 422 may be executed by the processor 410 to analyze a predicate state of a received packet of data. The retrieve instructions 424 may be executed by the processor 410 to retrieve a plurality of instructions, each of the instructions associated with predication criteria. The compare instructions 426 may be executed by the processor 410 to compare the predicate state to the predication criteria of each of the instructions to determine if any of the predication criteria includes the predicate state. The forward instructions 428 may be executed by the processor 410 to forward, to an execution unit (not shown), the one or more instructions associated with the predication criteria that include the predicate state. The execution unit is to execute the forwarded instructions on the packet of data. Moreover, due to the predication criteria effectively determining jumps or branches beforehand, the execution unit does not receive such types of instructions and thus may execute a different instruction each clock cycle of the execution unit.

Figure 5:
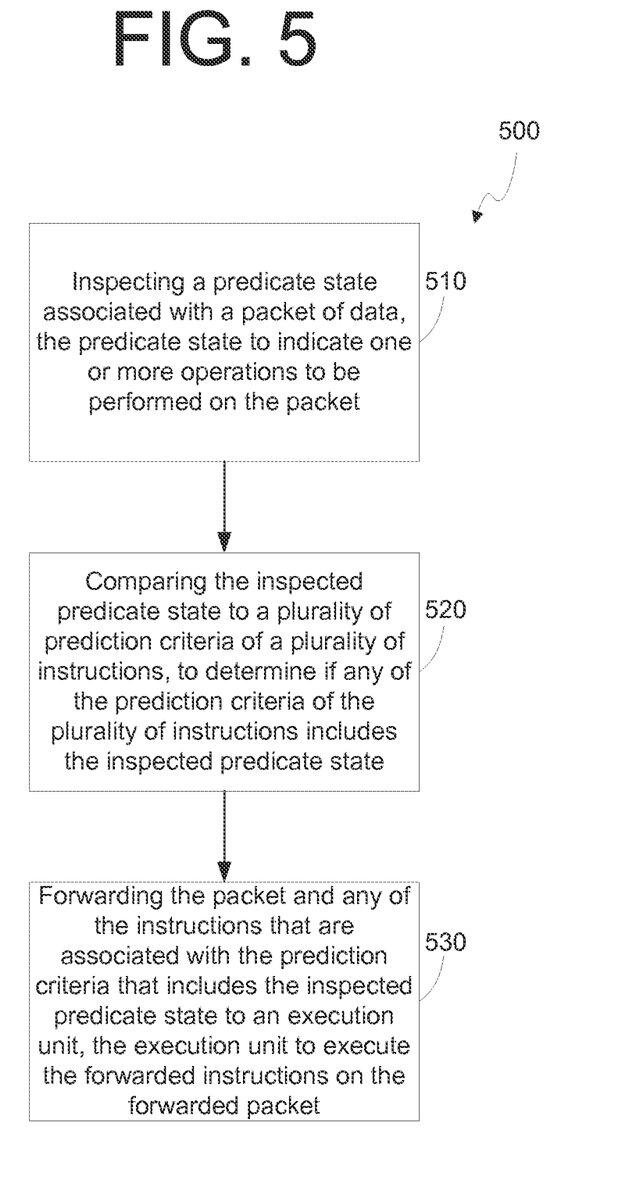
FIG. 5 is an example flowchart of a method for forwarding an instruction based on predication criteria.

FIG. 5 is an example flowchart of a method 500 for forwarding an instruction based on predication criteria. Although execution of the method 500 is described below with reference to the device 200, other suitable components for execution of the method 500 can be utilized, such as the device 100. Additionally, the components for executing the method 500 may be spread among multiple devices. The method 500 may be implemented in the form of executable instructions stored on a machine-readable storage medium, such as storage medium 420, and/or in the form of electronic circuitry.

At block 510, the device 200 inspects a predicate state 254 associated with a packet of data 250'. The predicate state 254 is to indicate one or more operations to be performed on the packet 250'. Next, at block 520, the device 200 compares the inspected predicate state 254' to a plurality of predication criteria 216-1 to 216-n of a plurality of instructions 214-1 to 214-n, to determine if any of the predication criteria 216-1 to 216-n of the plurality of instructions 214-1 to 214-n includes the inspected predicate state 254'. Then, at block 530, the device 200 forwards the packet 250' and any of the instructions 214-1 to 214-n that are associated with the predication criteria 216-1 to 216-n that includes the inspected predicate state 254' to an execution unit 230. The execution unit 230 is to execute the one or more forwarded instructions 214 on the forwarded packet 250'.

Figure 6:
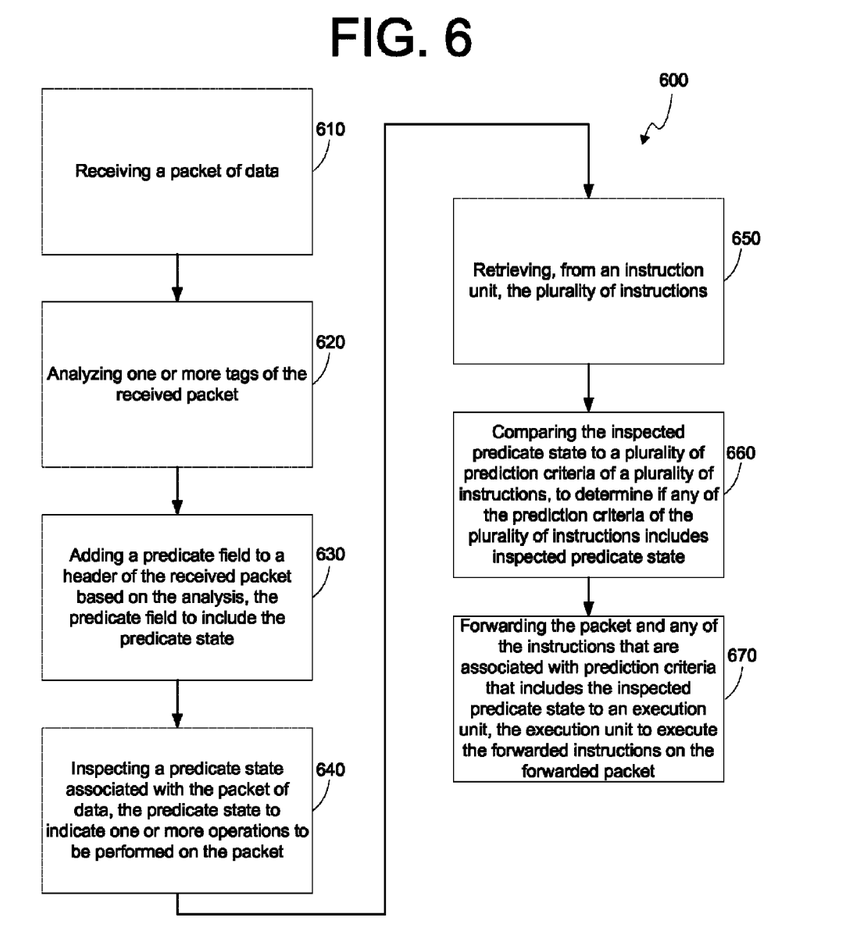
FIG. 6 is another example flowchart of a method for forwarding an instruction based on predication criteria.

FIG. 6 is another example flowchart of a method 600 for forwarding an instruction based on predication criteria. Although execution of the method 600 is described below with reference to the device 200, other suitable components for execution of the method 600 can be utilized, such as the device 100. Additionally, the components for executing the method 600 may be spread among multiple devices. The method 600 may be implemented in the form of executable instructions stored on a machine-readable storage medium, such as storage medium 420, and/or in the form of electronic circuitry.

At block 610, the device 200 receives a packet of data 250, such as via a network connection. Next, at block 620, the device 200 analyzes one or more tags 252 of the received packet 250. At block 630, the device 200 adds a predicate field 254 to a header of the received packet 250' based on the analysis. The predicate field 254 includes a predicate state of the packet 250'. Then, at block 640, the device 200 inspects the predicate state 254 associated with the packet 250'. The predicate state 254 is to indicate one or more operations to be performed on the packet 250'.

Further, at block 650, the device 200 retrieves, from an instruction unit 210, a plurality of instructions 214-1 to 214-n. Next, at block 660, the device 200 compares the inspected predicate state 254' to a plurality of predication criteria 216-1 to 216-n of the plurality of instructions 214-1 to 214-n, to determine if any of the predication criteria 216-1 to 216-n of the plurality of instructions 214-1 to 214-n includes the inspected predicate state 254'. Then, at block 670, the device 200 forwards the packet 250' and any of the instructions 214-1 to 214-n that are associated with the predication criteria 216-1 to 216-n that includes the inspected predicate state 254' to an execution unit 230. The execution unit 230 is to execute the one or more forwarded instructions 214 on the forwarded packet 250'.

According to the foregoing, embodiments may provide a method and/or device for predicate based instruction loading to implement branch-type instructions of a program without affecting the data throughput or drastically increasing memory requirements. Using predicate bits for the predication criteria and predicate state may provide a relatively large amount of flexibility, thus allowing a single program in a memory to be used on a multitude of possible transforms, thereby reducing the memory size while avoiding the processing of branch instructions at the execution unit. Thus, embodiments may allow for improved throughput performance with reduced memory requirements and at a lower cost, when compared to non-predicate based techniques.

We claim:

1. A device, comprising:
   an instruction unit to store a program including an instruction associated with predication criteria;

a fetch unit to compare a predicate state associated with a current packet of data to the predication criteria, wherein the fetch unit is to forward the instruction to an execution unit when the predication criteria includes the predicate state of the current packet of data, wherein the predicate state associated with the current packet is determined before the current packet is received by the execution unit, and the execution unit is to not inspect the predicate state of the current packet of data; and a predicate unit to perform an analysis on the current packet of data and to add a predicate field to the current packet of data, the predicate field to include the predicate state and a value of the predicate state is to be based on the analysis, wherein the predicate unit analyzes at least one of: a packet header, a tag, or a packet size, of the current packet of data.

2. The device of claim 1, wherein the fetch unit is to not forward the instruction to the execution unit when the predication criteria does not include the predicate state.

3. The device of claim 2, wherein the predicate state indicates at least one operation to be performed on the current packet of data associated with the predicate state, and
the predication criteria indicates at least one predicate state for which the instruction associated with the predication criteria is be executed.

4. The device of claim 2, wherein the program includes a plurality of instructions, each of the plurality of instructions associated with separate predication criteria, and
the fetch unit is to fetch the plurality of instructions and to discard any of the plurality of instructions that is fetched for which the predication criteria does not include the predicate state of the current packet of data.

5. The device of claim 4, wherein the fetch unit includes a plurality of buffers accessible by the execution unit, the plurality of buffers including,
a data buffer unit to store at least one incoming packet of data,
an instruction buffer unit to store the plurality of instructions fetched from the instruction unit, and
a variable buffer unit to store information specific to the at least one incoming packet of data, the specific information including at least one of: the predicate state or a new address.

6. The device of claim 5, wherein the fetch unit is to forward the instruction to the instruction buffer unit when the predication criteria includes the predicate state of the current packet of data, and
the execution unit is to retrieve instructions to execute from the instruction buffer unit.

7. The device of claim 1, wherein the execution unit is to execute the instruction on the current packet of data and to output an executed packet, and
the fetch unit is to fetch a next packet of data while the current packet of data is being executed.

8. The device of claim 7, wherein the instruction is to at least one of: copy without changes, insert information into, replace or delete at least part of the current packet of data, at least part of the current packet of data includes at least one of a media access control (MAC) address, a time to live (TTL) field, a type of service (TOS) field, a tag, a header or a payload, and
the predicate state is a value and the predication criteria is a set of at least one value.

9. The device of claim 7, wherein the instruction executed by the execution unit is not at least one of: a branch or jump instruction.

10. A method, comprising:
receiving a packet of data;
analyzing at least one tag of the packet of data that is received;
adding a predicate field to a header of the packet of data that is received based on the analyzing, wherein the predicate field is to include a predicate state;
retrieving, from an instruction unit, a plurality of instructions;
inspecting the predicate state associated with a packet of data after the receiving, the analyzing, the adding and the retrieving, the predicate state to indicate at least one operation to be performed on the packet of data;
comparing the predicate state that is inspected to a plurality of predication criteria of the plurality of instructions that is retrieved from the instruction unit, to determine when any of the predication criteria of the plurality of instructions includes the predicate state that is inspected; and
forwarding the packet of data and the any of the plurality of instructions that are associated with predication criteria that includes the predicate state that is inspected to an execution unit, the execution unit to execute the any of the plurality of instructions that is forwarded on the packet of data that is forwarded.

11. A non-transitory computer-readable storage medium storing instructions that, when executed by a processor of a device, cause the processor to:
analyze a predicate state of a received packet of data, wherein a predicate field that includes the predicate state is added to a header of the received packet of data based on an analysis of at least one tag of the received packet of data;
retrieve a plurality of instructions from an instruction unit, each of the plurality of instructions associated with predication criteria;
inspect the predicate state of the received packet of data, wherein the predicate state indicates at least one operation to be performed on the received packet of data;
compare the predicate state to the predication criteria of each of the plurality of instructions to determine when the predication criteria includes the predicate state that is inspected; and
forward, to an execution unit, the plurality of instructions associated with the predication criteria that include the predicate state that is inspected, the execution unit to execute the plurality of instructions that is forwarded on the received packet of data.

12. The non-transitory computer-readable storage medium of claim 11, wherein the execution unit is to execute a different instruction each clock cycle.

\* \* \* \* \*